United States Patent
Webb et al.

(10) Patent No.: US 9,479,214 B2
(45) Date of Patent: Oct. 25, 2016

(54) WIDEBAND ACTIVE RADIO FREQUENCY INTERFERENCE CANCELLATION SYSTEM

(71) Applicant: Raytheon Company, Waltham, MA (US)

(72) Inventors: Kenneth M. Webb, North Hills, CA (US); Charles A. Hall, Fort Wayne, IN (US); Tina P. Srivastava, Winchester, MA (US); Anthony T. McDowell, Fort Wayne, IN (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/553,076

(22) Filed: Nov. 25, 2014

(65) Prior Publication Data

US 2015/0155899 A1   Jun. 4, 2015

Related U.S. Application Data

(60) Provisional application No. 61/908,373, filed on Nov. 25, 2013.

(51) Int. Cl.
*H04B 1/525* (2015.01)
(52) U.S. Cl.
CPC ..................... *H04B 1/525* (2013.01)
(58) Field of Classification Search
CPC combination set(s) only.
See application file for complete search history.

(56) References Cited

U.S. PATENT DOCUMENTS

| | | |
|---|---|---|
| 5,574,978 A | 11/1996 | Talwar et al. |
| 5,945,940 A | 8/1999 | Cuomo |
| 5,974,301 A | 10/1999 | Palmer et al. |
| 6,452,446 B1 | 9/2002 | Eisenberg et al. |
| 6,771,931 B2 | 8/2004 | Waltho |
| 6,989,782 B2 | 1/2006 | Walker et al. |
| 7,447,519 B2 | 11/2008 | Axness et al. |
| 7,801,493 B2 | 9/2010 | Do |
| 7,834,719 B2 | 11/2010 | Cheung et al. |
| 7,855,617 B2 | 12/2010 | Cheung et al. |
| 7,868,837 B2 | 1/2011 | Yun et al. |
| 7,894,779 B2 | 2/2011 | Meiyappan et al. |
| 2002/0193071 A1 | 12/2002 | Waltho |
| 2004/0142700 A1 | 7/2004 | Marinier |

(Continued)

FOREIGN PATENT DOCUMENTS

EP    1573352 B1    3/2011

OTHER PUBLICATIONS

International Search Report and Written Opinion; International Application No. PCT/US2014/067213; International Filing Date: Nov. 25, 2014; Date of Mailing: Feb. 5, 2015; 11 pages.

(Continued)

*Primary Examiner* — Junpeng Chen
(74) *Attorney, Agent, or Firm* — Cantor Colburn LLP

(57) ABSTRACT

A wideband radio frequency (RF) interference cancellation system includes an electronic channel canceller configured to split an electronic reference signal output from an electronic transmitting element into a plurality of band signals. At least one electronic band pass filter is configured to receive a respective band signal delivered to a respective channel. The wideband RF interference cancellation system further includes at least one electronic tunable cancellation element configured to tune the respective channel such that reflections are canceled before being input to receiving element.

16 Claims, 13 Drawing Sheets

(56) References Cited

U.S. PATENT DOCUMENTS

| | | |
|---|---|---|
| 2005/0207509 A1 | 9/2005 | Saunders et al. |
| 2006/0098765 A1 | 5/2006 | Thomas et al. |
| 2008/0081551 A1 | 4/2008 | Posamentier |
| 2008/0272959 A1 | 11/2008 | Meharry et al. |
| 2009/0213770 A1 | 8/2009 | Mu |
| 2009/0325509 A1* | 12/2009 | Mattisson ............... H04B 1/525 455/75 |
| 2010/0159865 A1 | 6/2010 | Fudge |
| 2010/0159866 A1 | 6/2010 | Fudge et al. |
| 2011/0143691 A1 | 6/2011 | Van Aken et al. |
| 2012/0140860 A1 | 6/2012 | Rimini et al. |
| 2014/0099893 A1 | 4/2014 | Kheirkhahi et al. |
| 2014/0147112 A1 | 5/2014 | Abe |
| 2014/0194071 A1* | 7/2014 | Wyville ................. H04B 1/525 455/73 |

OTHER PUBLICATIONS

Cheng, "Cancellation Circuit for Transmit-Receive Isolation", Naval Postgraduate School Thesis Paper, Sep. 2010, pp. 1-83.

Hoffman et al., "Subband Stap in Wideband Radar Systems", Sensor Array and Multichannel Signal Processing Workshop, Proceedings of the 2000 IEEE, pp. 256-260.

Rabinkin et al., "Subband-Domain Signal Processing for Radar Array Systems", SPIE Conference on Advanced Signal Processing Algorithms, Architectures, and Implementations IX, Jul. 1999, pp. 174-187.

* cited by examiner

2

WIDEBAND ACTIVE RADIO FREQUENCY INTERFERENCE CANCELLATION SYSTEM

CROSS-REFERENCE TO RELATED APPLICATION

This application is a non-provisional of U.S. Provisional Patent Application Ser. No. 61/908,373, filed Nov. 25, 2013, the disclosure of which is incorporated by reference herein in its entirety.

BACKGROUND

The present disclosure relates to simultaneous transmission and receiving systems, and more particularly, to cancelling wideband active radio frequency (RF) interference in a simultaneous transmission and receiving system.

Conventional systems capable of transmitting and receiving data simultaneously will be subject to leakage and/or reflections. The leakage and/or reflections can saturate the first gain stage in the receive path. The saturation, however, prevents the system from operating properly.

SUMMARY

According to an embodiment, a wideband radio frequency (RF) interference cancellation system includes an electronic channel canceller configured to split an electronic reference signal output from an electronic transmitting element into a plurality of band signals. At least one electronic band pass filter is configured to receive a respective band signal delivered to a respective channel. The wideband RF interference cancellation system further includes at least one electronic tunable cancellation element configured to tune the respective channel such that reflections are canceled before being input to receiving element.

According to another embodiment a method of actively cancelling interference from a wideband radio frequency system comprises splitting an electronic reference signal output from an electronic transmitting element into a plurality of band signals. The method further includes receiving a respective band signal delivered to a respective channel using at least one electronic band pass filter. The method further includes tuning the respective channel such that reflections are canceled before being input to the receiving element.

Additional features are realized through the techniques of the present disclosure. Other exemplary embodiments are described in detail herein and are considered a part of the claimed invention. For a better understanding of the various exemplary embodiments, the following description is provided.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

At least one embodiment of the disclosure provides a feed-forward cancellation system that is configured to mitigate reflection and/or leakage in a simultaneous transmission and receiving system, for example. The same system can also mitigate Radio Frequency Interference (RFI) from external sources including the environment and jammers. The feed-forward cancellation system comprises a frequency domain centric system, a time domain centric system, or a combination of a frequency domain and time domain centric system to cancel interference and leakage signals as they enter the receiving portion of the system. The interference signals include, but are not limited to, self-inflicted wideband interference signals and interference signals. Accordingly, saturation of all receive stages, including the Analog to Digital Converter (ADC), are prevented. If linearity is maintained from the RF front-end through the digitizing process, then the digital signal processing (DSP) end of the system can remove the interference residue with high levels of precision.

Figure 1:
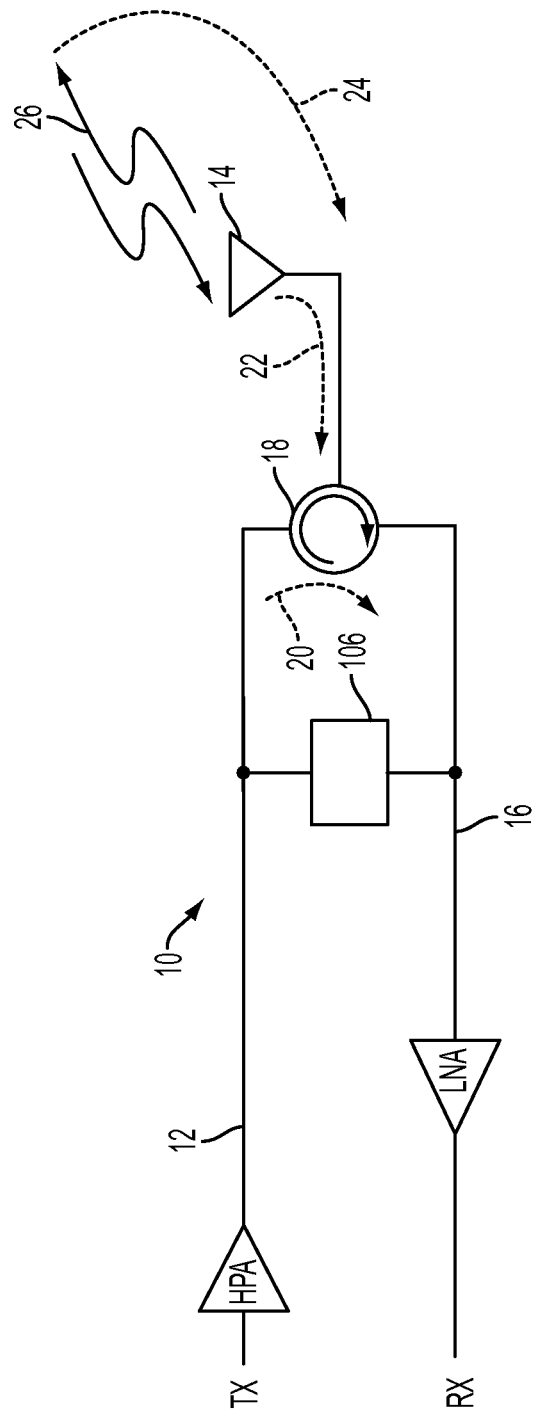
FIG. 1 is a schematic diagram generally illustrating a feed-forward system according to an exemplary embodiment of the present disclosure.

Referring to FIG. 1, a feed-forward cancellation system 10 transmits an original signal on a transmission line 12 to an antenna 14, and mitigates and/or cancels one or more reflected signals received on a receiving line 16. In at least one embodiment, an incoming received signal present at the receiving port of a circulator 18 is similar to the transmitted signal from the system 10 due to one or more signal reflections and/or signal leakage. Various reflected and/or leakage signals are canceled by the feed-forward cancellation system 10. For example, the feed-forward cancellation system 10 cancels leakage signals 20, antenna reflection signals 22, and interference signals 24. The leakage signals 20 include, for example, a portion of the original transmission signal that leaks through the circulator 18 and onto the receiving line 16. The antenna reflection signals 22 include signals that are reflected back from the antenna 14. The interference signals 24 include reflected signals 26 received by the receiving line 16 that are reflected from the external environment. The external environment includes, but is not limited to, mountainous terrain, aircraft, naval vessels and land vehicles.

At least one exemplary embodiment of a feed-forward cancellation system 10 according to the present disclosure includes a cancellation unit 106 configured to split a wideband transmission signal into a plurality of sub-band signals. The cancellation unit 106 is interposed between the transmission line 12 and the receiving line 16 as further illustrated in FIG. 1. According to an embodiment, the split sub-bands are equal to one another. Each sub-band signal is delivered to a respective band pass filter which feeds the channels of a signal canceller. Each channel uses a feedback loop fed by the post cancelled signal to optimize the signal cancellation. Each channel includes, for example, a tunable RF delay and amplitude circuit which is controlled by a digital controller.

Figure 2:
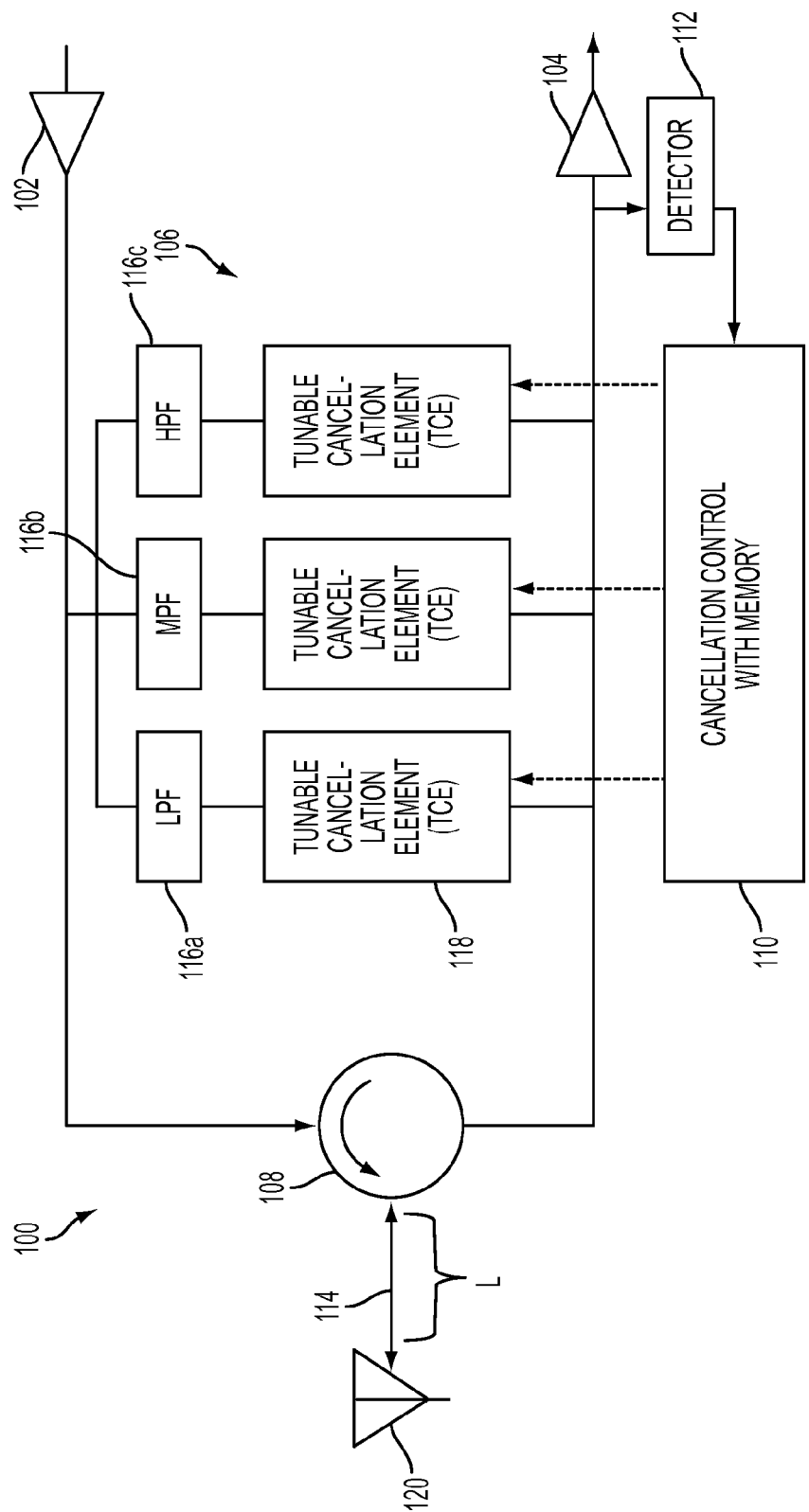
FIG. 2 is a schematic diagram illustrating a frequency domain channelized active RF cancellation architecture for wideband signals according to an exemplary embodiment.

Referring to FIG. 2, for example, a frequency domain feed-forward cancellation system 100 is illustrated according to at least one exemplary embodiment. The frequency domain feed-forward cancellation system 100 includes a transmitting element 102, a receiving element 104, a cancellation unit 106, a circulator 108, a canceller microcontroller 110, and a signal detector 112. The transmitting element 102 includes a power amplifier (PA), which outputs a transmission signal to a transmission line/radiator to transmission path 114. The receiving element 104 includes a low noise amplifier (LNA), which receives a transmission signal from transmission path 114. The cancellation unit 106 is communicatively interposed between the transmitting element 102 and the receiving element 104. In this regard, the cancellation unit 106 cancels leakage of the transmission signal through the circulator 108 before the leakage is fed to the receiving element 104. As a result, a signal received from free space excluding leakage is provided. The cancellation unit 106 also cancels reflections of the free space transmission signal received from free space before the transmission signal is fed into the receiving element 104.

According to at least one exemplary embodiment, the cancellation unit 106 is configured as a channelized canceller 106. The channelized canceller 106 includes one or more filter elements 116 and one or more respective tunable cancellation elements (TCE) 118 configured to actively cancel reflections in a transmission signal received from transmission path 114 before the transmission signal is received by the receiving element 104. According to at least one embodiment illustrated in FIG. 2, the channel canceller 106 includes a low pass filter (LPF) 116*a*, a mid pass filter (MPF) 116*b*, and a high pass filter (HPF) 116*c*. It is appreciated that the combination of filter elements 116 is not limited thereto. The channelized canceller 106 is configured to process broad frequency bandwidths and/or systems with mismatched components. For example, an active cancellation process and a sub-banding process to mitigate reflection are performed immediately upon receiving the signal from free-space. The channelized canceller 106 first splits the transmit signal into one or more frequency bands to ease the cancellation requirements. This allows wider bandwidths to be addressed without suffering degradation at the bands edges. This concept can be expanded to include more than three frequency bands depending on mitigation requirements and system characteristics.

A respective TCE 118 is interposed between each filter 116 and the receiving element 104. The feed-forward cancellation system, (e.g., active cancellation and sub-banding), therefore, operates on the transmission signal received from transmission path 114 before the signal is fed to the receiving element 104. According to at least one embodiment, each TCE 118 has different frequency response settings with respect to one another. For example, a first TCE 118 connected to the LPF has a frequency response setting with a different slope or transfer function than the mid or high portions of the signal. A second TCE 118 connected to the MPF has a frequency response with a different characteristic. Thus, each TCE 118 is able to optimize the matching of the transmission signal frequency response in order to most effectively cancel it.

The circulator 108 is communicatively coupled to an antenna 120 (e.g., a blade antenna), via a transmission path 114. The transmission path 114 has a length (L). The circulator 108 receives reflections back from the antenna 120 due to mismatches in both the transmitting and receiving lines. The canceller microcontroller 110 is configured to control one or more of the TCEs 118 to actively tune a respective channel. The signal detector 112 (hereinafter referred to as detector 112) has an input interposed between the circulator 108 and the receiving element 104, for example, and an output that is connected to the canceller microcontroller 110. The characteristics of the transmission signal (e.g., reflections, leakage, voltage level, frequency, etc.) traveling on the receiving line is therefore detected before being fed into the receiving element 104, and before being provided to the canceller microcontroller 110. The canceller microcontroller 110 therefore dynamically controls one or more TCEs 118 to actively remove undesired signals before the undesired signals are input to the LNA 104, for example. Although the frequency domain cancellation system 100 is illustrated as an active cancellation system 100, it is appreciated that the canceller microcontroller 110 can be omitted to provide a passive frequency domain cancellation system.

Figure 3:
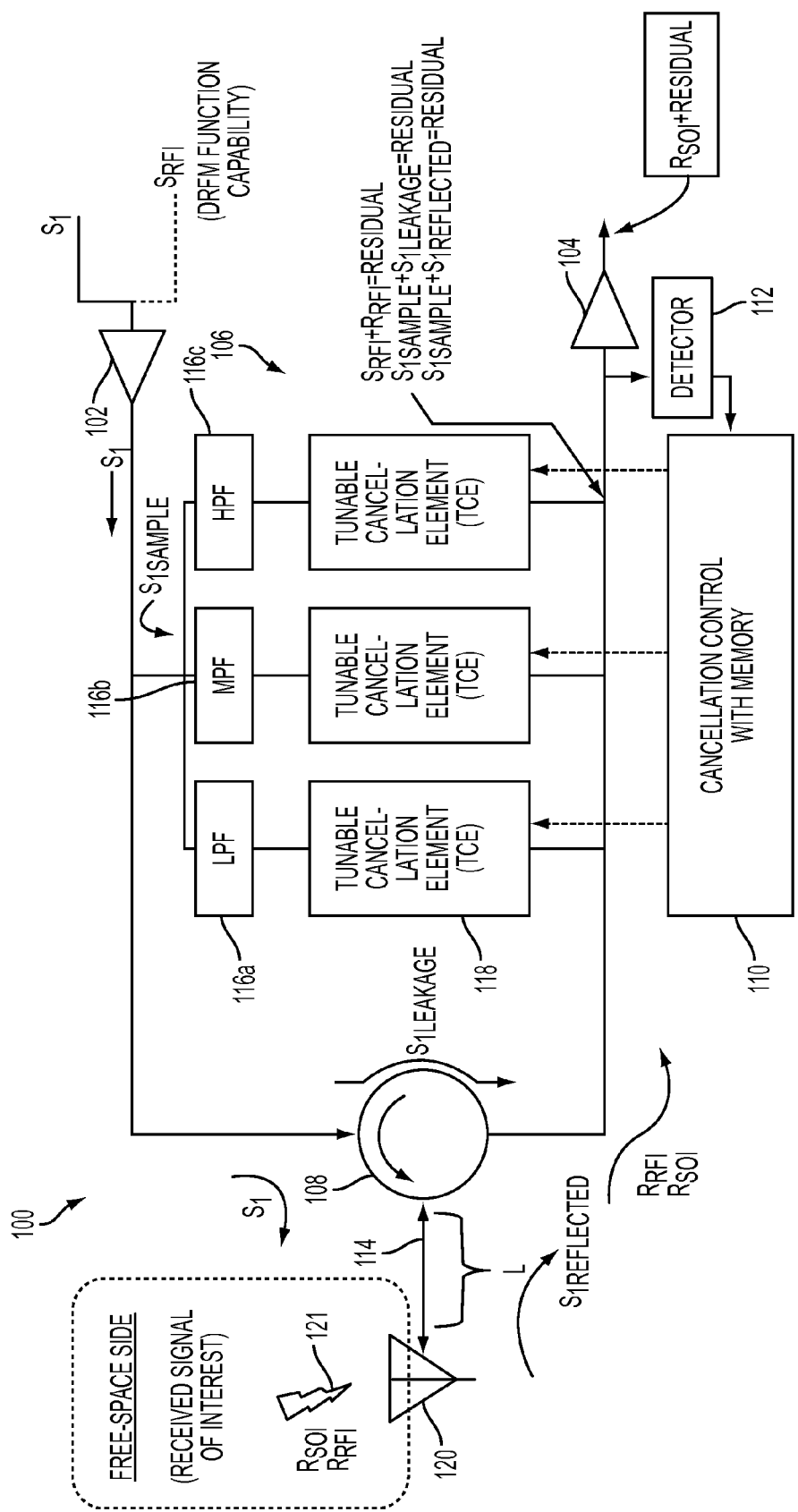
FIG. 3 is a schematic diagram illustrating a signal flow through the frequency domain channelized active RF cancellation architecture for wideband signals according to an exemplary embodiment.

Referring to FIG. 3, a signal view of the system 100 is illustrated according to at least one embodiment. During normal leakage mitigation, an original signal (S1) is generated by the system 100 and is amplified by the transmitting element 102. A small portion of S1 is diverted to the channelized canceller 106 where it is processed by the TCEs to cancel the leakage. The remaining portion of S1 is sent out to the transmission path/radiator 114, where it is transmitted over free space. A portion (S1 leakage) of the original transmission signal S1 leaks through the circulator 108 and on to the receiving line. This unwanted leakage is cancelled using the S1 sample processed by the channelized canceller 106. Similarly, a portion (S1 reflected) of S1 also reflects off of the antenna 120 as the original transmission signal S1 travels through free space. The reflected signal is also cancelled using the output of the channelized canceller 106. Cancelling the S1 leakage and/or the S1 reflected signals allows the system 100 to better detect the received signal of interest (RSOI) by removing the saturation (i.e., the S1 leakage and/or S1 reflected signals) or reducing the saturation to low residual levels.

It is also possible for the frequency domain approach to be applied to a system (such as a Digital RF Memory—DRFM system) which is capable of synthesizing a received wideband pulse or an a priori frequency response and using the active channelized canceller to mitigate wideband RF interference received from external sources.

Figure 4:
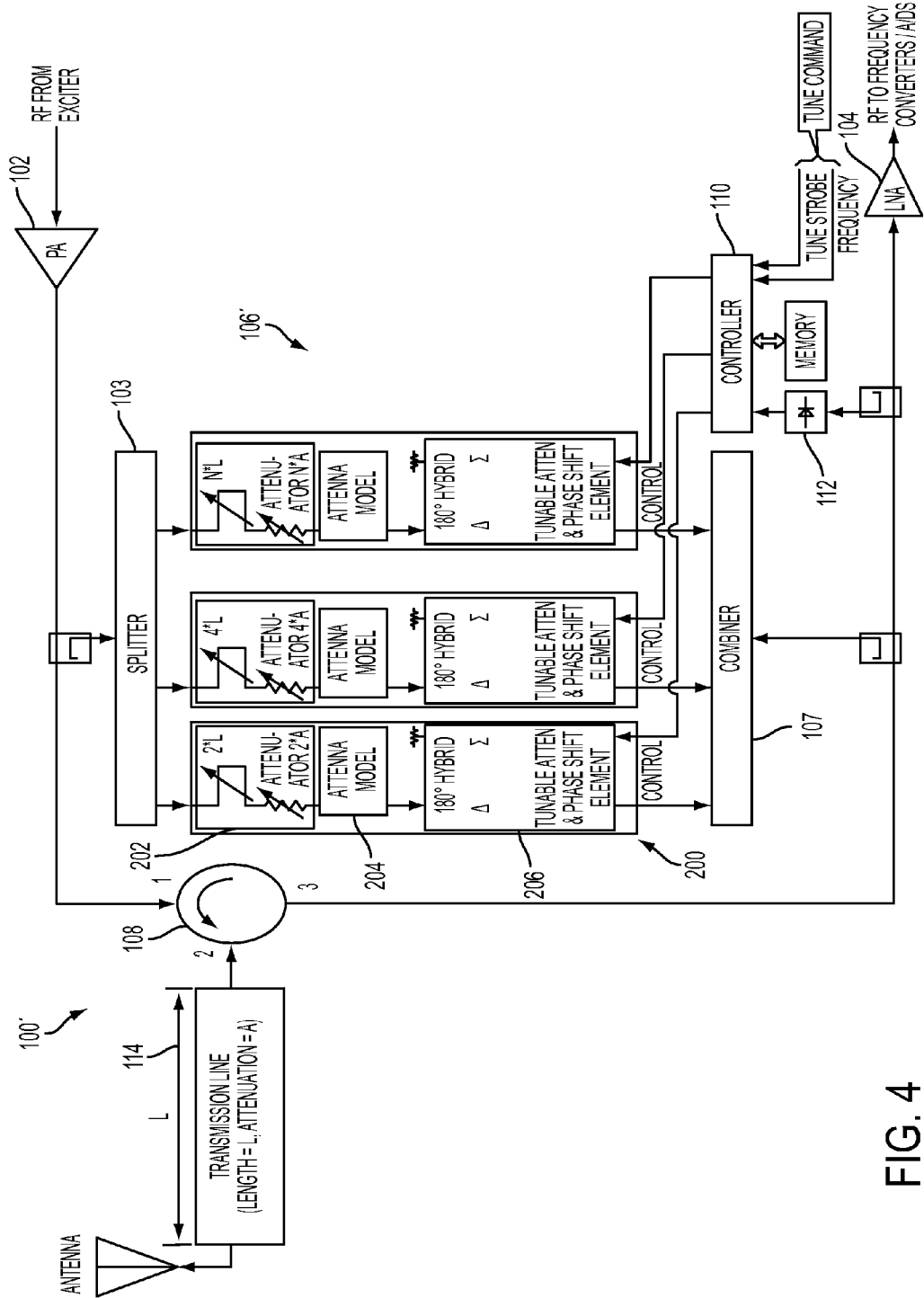
FIG. 4 is a schematic diagram illustrating a time domain feed-forward cancellation system according to at least one exemplary embodiment.

Referring to FIG. 4, the system 100' is illustrated according to another embodiment. The system 100' illustrated in FIG. 4 is configured as a time domain feed-forward cancellation system 100'. The time domain feed-forward cancellation system 100' includes a transmitting element 102, a splitter 103, a receiving element 104, a cancellation unit 106', a combiner 107, a circulator 108, a canceller microcontroller 110, and a detector 112. The transmitting element 102 includes a power amplifier (PA), for example. The transmitting element 102 outputs a transmission signal to transmission path 114 that is in electrical communication with an antenna 120. The receiving element 104 includes a low noise amplifier (LNA), for example. The receiving element 104 receives a transmitted signal transmitted from the antenna 120 via the transmission path 114.

The cancellation unit 106' is interposed between the splitter 103 and the combiner 107. In this regard, the cancellation unit 106' cancels leakage of the transmission signal through the circulator 108 before the leakage is fed to the receiving element 104. As a result, a signal received from free space excluding leakage is processed at the receiver side of the system 100'. The cancellation unit 106' can also cancel undesired reflections of the free space transmission signal before the transmission signal is fed into the receiving element 104. According to at least one exemplary embodiment, the signal output from the transmitting element 102 is split out by delay lengths based on the primary reflection paths back to the receivers. Multiple mitigation paths with differing time delays provide cancellation from interference signals separated in time, mainly due to the transmission path between the circulator 108 and the antenna 120. These paths include: leakage directly through the circulator to the receiver; reflections from the antenna back to the receiver; reflections from the antenna that reflect back from the circulator, and which reflect again off of the antenna back to the receiver; reflections from the aircraft structure back to the receiver; reflections from the ground back to the receiver;

As illustrated further in FIG. 4, at least one embodiment couples off (i.e., diverts) a small amount of the transmitted signal to the splitter 103. The splitter 103 splits the diverted signal into a plurality of sub-signals. Each sub-signal is delivered to a respective cancellation path 200 of the cancellation unit 106'. Each cancellation path 200 includes a variable attenuator 202, an electronic antenna modeling control unit (i.e., an antenna modeler) 204, and an electronic phase/amplitude shifter 206. The cancellation unit 106' controls a time delay corresponding to a respective path 200. According to at least one embodiment, each path 200 has a different time delay associated with it. The delay of each of the paths 200 corresponds with the time it takes for the signal to reflect off of various fixed reflection points in the feed-forward cancellation system 100' as described above. Each path 200 associated with reflections from the antenna 120 also includes a network having forward transfer characteristic that match the reflection characteristic of the antenna 120. The phase/amplitude shifter 206 inverts the diverted signal to create a cancellation signal that is 180 degrees out of phase with respect to the leaked signal and/or reflected signal. The phase/amplitude shifter 206 also provides a fine adjustment of attenuation and phase of the cancellation signal. The combiner 107 combines all the paths 200 and delivers the combined signals from each of the paths 200 back on to the receive path of the feed-forward cancellation system 100'. Accordingly, the cancellation signal cancels the leaked signal and/or reflected signal existing on the receive path prior to delivering the signal traveling on the received path to the receiving element 104. Thus, each path 200 is selectively tuned such that when cancellation signals output from a respective path 200 are combined with the reflected signal existing on the receiving line, the reflected signals are cancelled.

Although not illustrated, it is appreciated that the feed-forward cancellation system 100' described above can be combined with the embodiments shown in FIGS. 1-3. For example, one or more of the paths 200 connected to the splitter 103 are replaced with a cancellation unit 106 illustrated in FIGS. 1-3. In this regard, reflections occurring at particular time placements are removed using the cancellation system 106', while reflections caused by a wideband signal are removed using the cancellation unit 106. According to an exemplary embodiment, if the interference is self-inflicted reflection and/or leakage, then the original signal output from the transmitting element 102 determines whether a frequency cancellation approach or a time domain approach should be performed. According to another exemplary embodiment, if the interference is external, a radio frequency interference (RFI) cancellation is performed based on the bandwidth of the interfering signal.

Another embodiment of the feed-forward cancellation system is provided where the cancellation unit includes an electronic digital signal processor capable of replicating a leakage and/or interference signal that is expected to appear the receiving line. The digital signal processor generates the replicated signal in addition to the system's own operating signal, and uses the replicated signal to cancel the leakage and/or interference signals. According to at least one exemplary embodiment, the system's own signal of interest could be preserved while the RFI is mitigated.

Figure 5:
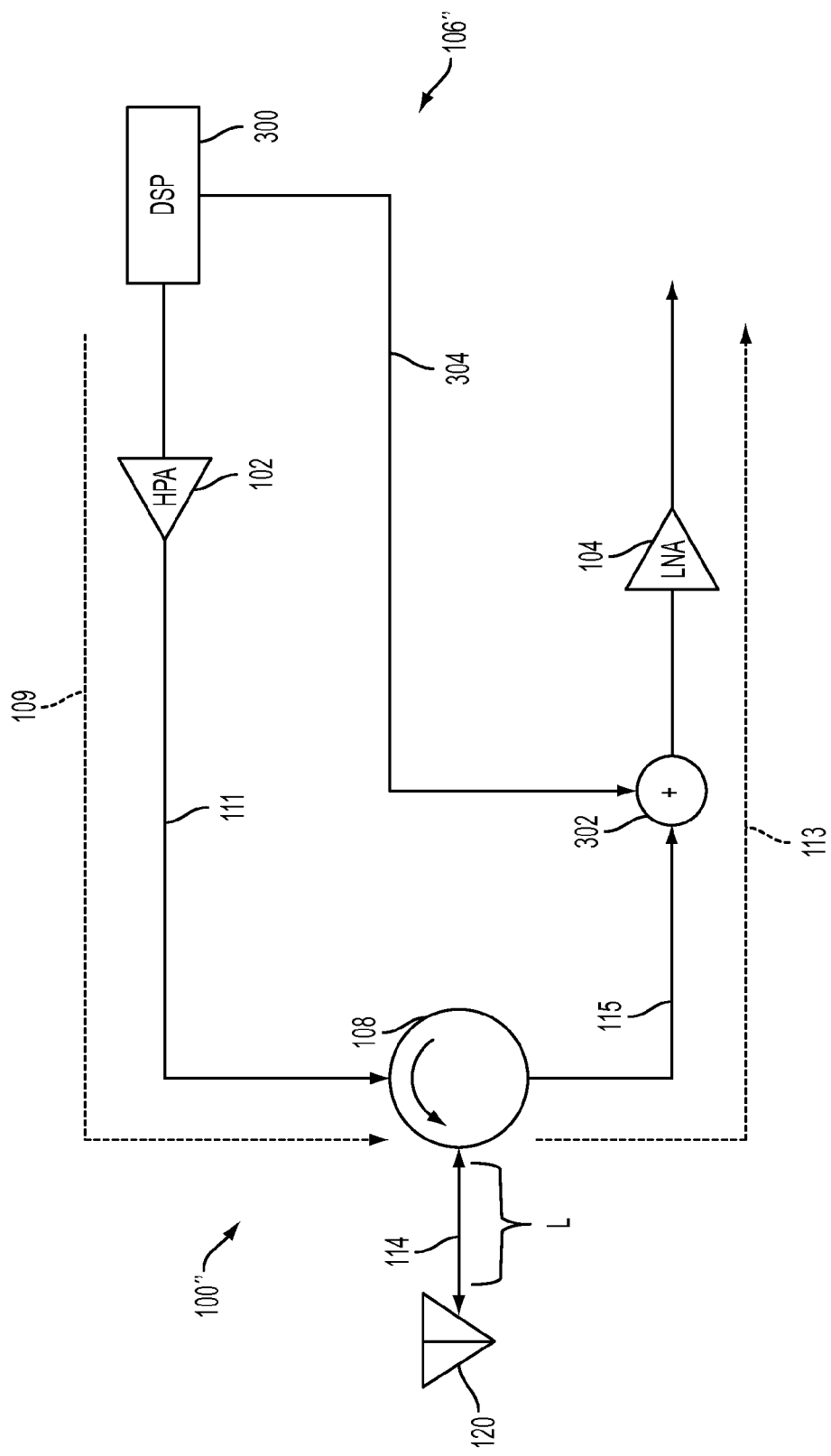
FIG. 5 is a schematic diagram illustrating a feed-forward cancellation system comprising a cancellation unit including an electronic digital signal processor capable of replicating a leakage and/or interference signal.

Referring to FIG. 5, for example, a feed-forward cancellation system 100" includes a transmitting element 102, a receiving element 104, a cancellation unit 106", and a circulator 108. The transmitting element 102 includes a power amplifier (PA), which outputs a transmission signal 109 to a transmitting line 111. The transmitting line 111 is in electrical communication with a transmission path 114. The transmission path 114 electrically communicates with an antenna 120 over free-space, for example. The receiving element 104 includes a low noise amplifier (LNA) 104. The LNA 104 is configured to receive a signal 113, e.g., a response signal 113, provided by an antenna 120, which is delivered to a receiving line 115 via a circulator 108.

The cancellation unit 106" includes an electronic digital signal processor (DSP) 300 and a signal combiner 302. The DSP 300 includes a first output that is in electrical communication with the transmitting line 111, and a second output that is in the electrical communication with the receiving line 115 via the signal combiner 302. The DSP 300 generates a transmission signal 109 that is delivered to the transmitting line 111. The transmission signal 109 is amplified by the first power amplifier 102 before being delivered to the transmitting line 111. The amplified transmission signal 109 is then transmitted to the antenna 120 via the circulator 108. The DSP 300 also generates a cancellation signal 304 that is delivered to the receiving line 115. Since the DSP 300 is aware of the transmission signal 109 to be generated, the cancellation signal 304 is generated with a phase that is shifted 180 degrees with respect to the transmission signal 109. According to an embodiment, the cancellation signal 304 is generated simultaneously with the transmission signal 109, or even prior to generating the transmission signal 109. In this regard, at least one exemplary embodiment provides a feature where the phase-shifted cancellation signal 304 cancels a portion of the transmission signal 109 that leaks through the circulator 108 and onto the receiving line 115. Since the DSP 300 is aware of the of the magnitude of the transmission signal 109, the DSP 300 may generate the cancellation signal 304 to have a magnitude that matches or is similar to the transmission signal 109. As a result, saturation on the receiving line 115 and/or saturation of the received signal 113 are eliminated.

Furthermore, the DSP 300 included in the embodiment of FIG. 5 eliminates the need for a channelized canceller. Since the DSP 300 is aware of the transmission signal 109 and simultaneously generates a cancellation signal 304 having a shifted phase, there is no need to include a channelized canceller for splitting a portion of the transmitted signal 109 and generating a cancellation signal based on the split signal. Since the transmission signal 109 is not split, the power amplification on the input line is maintained at a desired power level thereby improving the overall power efficiency of the feed-forward cancellation system 100".

Figure 6:
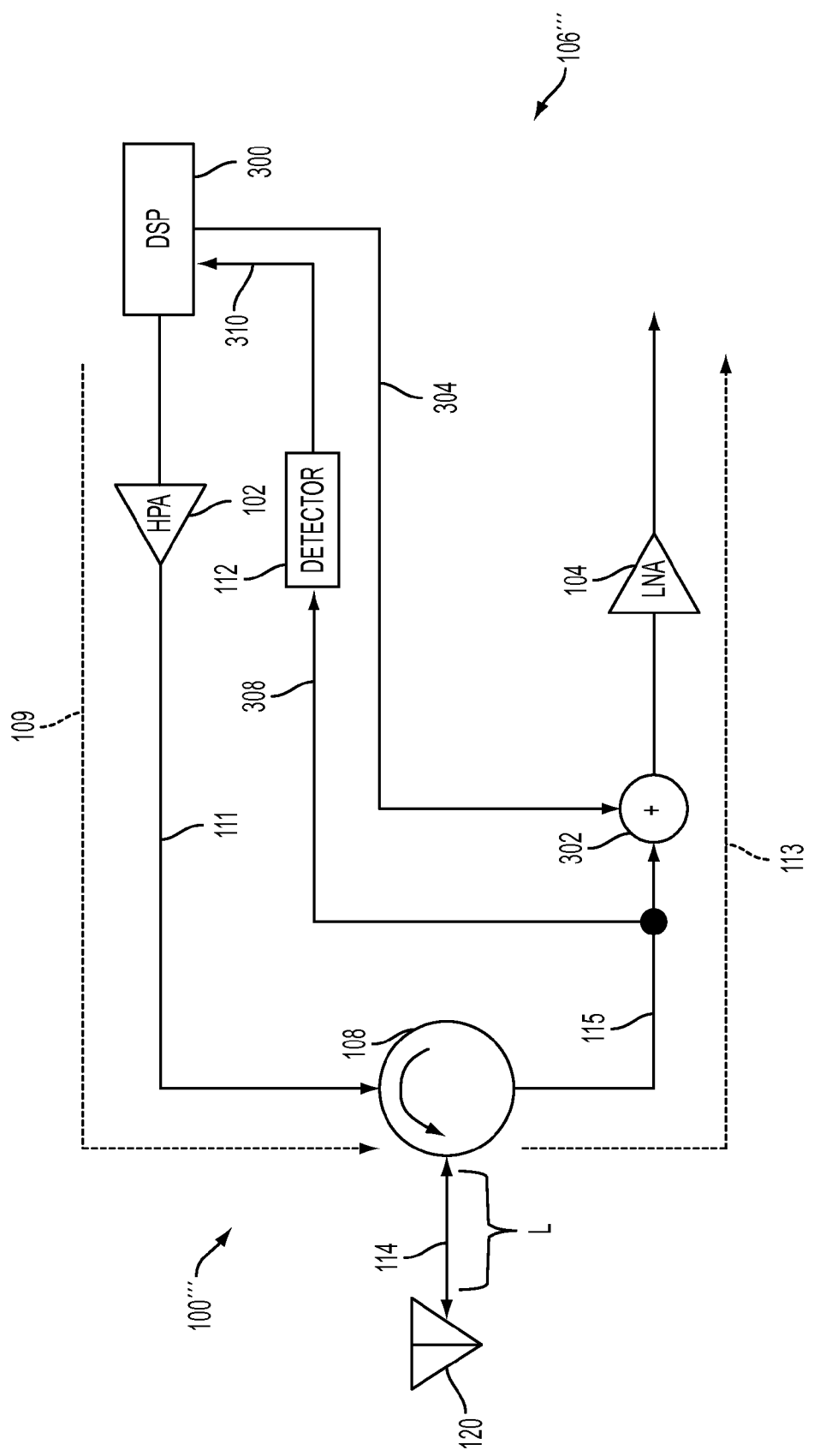
FIG. 6 is a schematic diagram illustrating a feed-forward cancellation system comprising a cancellation unit including an electronic digital signal processor and a signal detector capable of identifying one or more types of saturation.

Referring to FIG. 6, a feed-forward cancellation system 100''' is illustrated according to another exemplary embodiment. The feed-forward cancellation system 100''' operates similar to the feed-forward cancellation system 100'' as described in FIG. 5. The DSP 300, however, further includes an input in electrical communication with a detector 112. The detector 112 has an input in electrical communication with the receiving line 115 to form a sample signal path 308, and an output that is connected to an input of the DSP 300. The characteristics (e.g., reflections, leakage, noise, voltage level, frequency, etc.) of the received signal 113 traveling on the receiving line 115 is analyzed by the detector 112 via the sample signal delivered by the sample signal path 308. The detector 112 determines if the receiving line 115 is saturated (i.e., determines one or more leakage signals 20, antenna reflection signals 22, and/or interference signals 24) and generates an identification signal 310 to the DSP 300 indicating the type of saturation that exists. Accordingly, the DSP 300 receives the identification signal 310 and generates one or more cancellation signals 304 that are delivered to the receiving line 115. The cancellation signal 304 has a phase that is shifted 180 degrees with respect to the identified saturation (i.e., leakage signals 20, antenna reflection signals 22, and/or interference signals 24), thereby cancelling the saturation before the received signal 113 is delivered to the receiving element 104. The feed-forward cancellation system 100''' dynamically generates one or more types of cancellation signals 304 based on the detected saturation to actively improve the quality of the receiving line 115.

Still referring to FIG. 6, the DSP 300 is configured to identify a saturation signal (i.e., leakage signal 20, antenna reflection signal 22, and/or interference signal 24). According to an embodiment, the DSP 300 stores one or signal models of the saturation signal in memory, and compares the sample signal to the stored models to identify the saturation signal as, for example, a leakage signal 20, an antenna reflection signal 22, and/or interference signal 24. The DSP 300 then generates a cancellation signal 304 that selectively cancels one or more of the leakage signal 20, antenna reflection signal 22, and/or interference signal 24, while maintaining one or more of the remaining saturation signals. For example, the DSP 300 generates a cancellation signal that cancels the leakage signal 20 and the antenna reflection signal 22, while maintaining the signal 24 on the receiving line 115. In this regard, the leakage signal 20, antenna reflection signal 22, and/or interference signal 24 are independently identified and cancelled independently with respect to one another.

Figure 7:
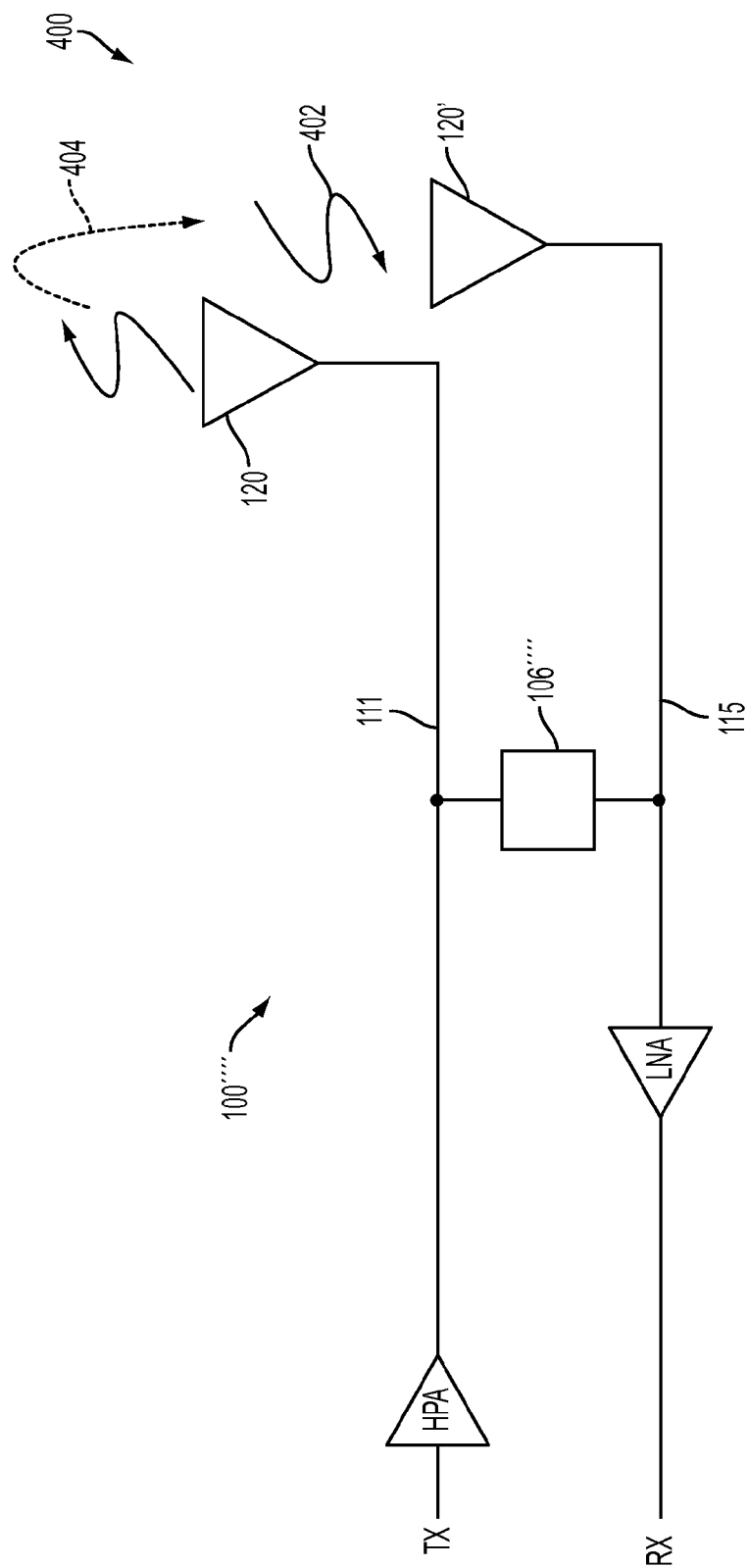
FIG. 7 is a schematic diagram generally illustrating a dual antenna feed-forward cancellation system according to an exemplary embodiment.

Although various embodiments described above include a single antenna configured to operate as both a transmitting antenna and a receiving antenna, some electronic systems operate according to very high power conditions. Consequently, a single antenna does not achieve adequate isolation. Therefore, another exemplary embodiment of a feed-forward cancellation system 100'''' illustrated in FIG. 7 is configured as a dual antenna system 400 that includes a first antenna 120 (e.g., a transmitting antenna 120) connected to a transmitting line 111, a separate second antenna 120' (e.g., a receiving antenna 120') connected to a receiving line 115, and a cancellation unit 106'''' electrically interposed between the first transmitting line 111 and the second receiving line 115. The first antenna 120 and the second antenna 120' are located remotely from one another by distance of, for example, approximately 3-6 feet (ft.).

The feed-forward cancellation system 100'''' is configured to couple off a portion of the transmit signal transmitted to the receiving antenna 120'. The coupled signal 402 is fed onto the receive path. According to at least one embodiment, the coupled signal 402 is phase shifted with respect to the transmit signal. In this case, the reflections leakage signals 20 and the antenna reflection signals 22 do not apply to the feed-forward cancellation system 100''''. However, one or more reflection signals 404 from the mutual coupling between the transmitting antenna 120 and receiving antenna 120' occurs. For example, the receiving antenna 120' still receives a very large signal from the transmitting antenna 120 that is located a close proximity away. Here, the unclassified power level assumptions are a transmit signal of approximately 60 power decibels (dBm) to approximately 80 dBm, for example. The signal is attenuated −60 dBm due to the physical separation between the transmitting antenna 120 and the receive antenna 120'. The attenuation results in a signal of 0 dBm to 20 dBm, for example, that propagates along a leakage path formed between the transmitting antenna 120 and receiving antenna 120'. The attenuated signal, i.e., the reflected/leaked signal 404, is received on the receive line 115 thereby saturating the receiving line 115 and/or the response signal delivered to the receiving line 115. However, the cancellation unit 106'''' is configured to eliminate or reduce the reflected/leaked signal 404 signal from the receiving line 115. In this regard, the performance of the feed-forward cancellation system 100'''' is improved in response to eliminating the saturation, i.e., the reflected/leaked signal.

Figure 8:
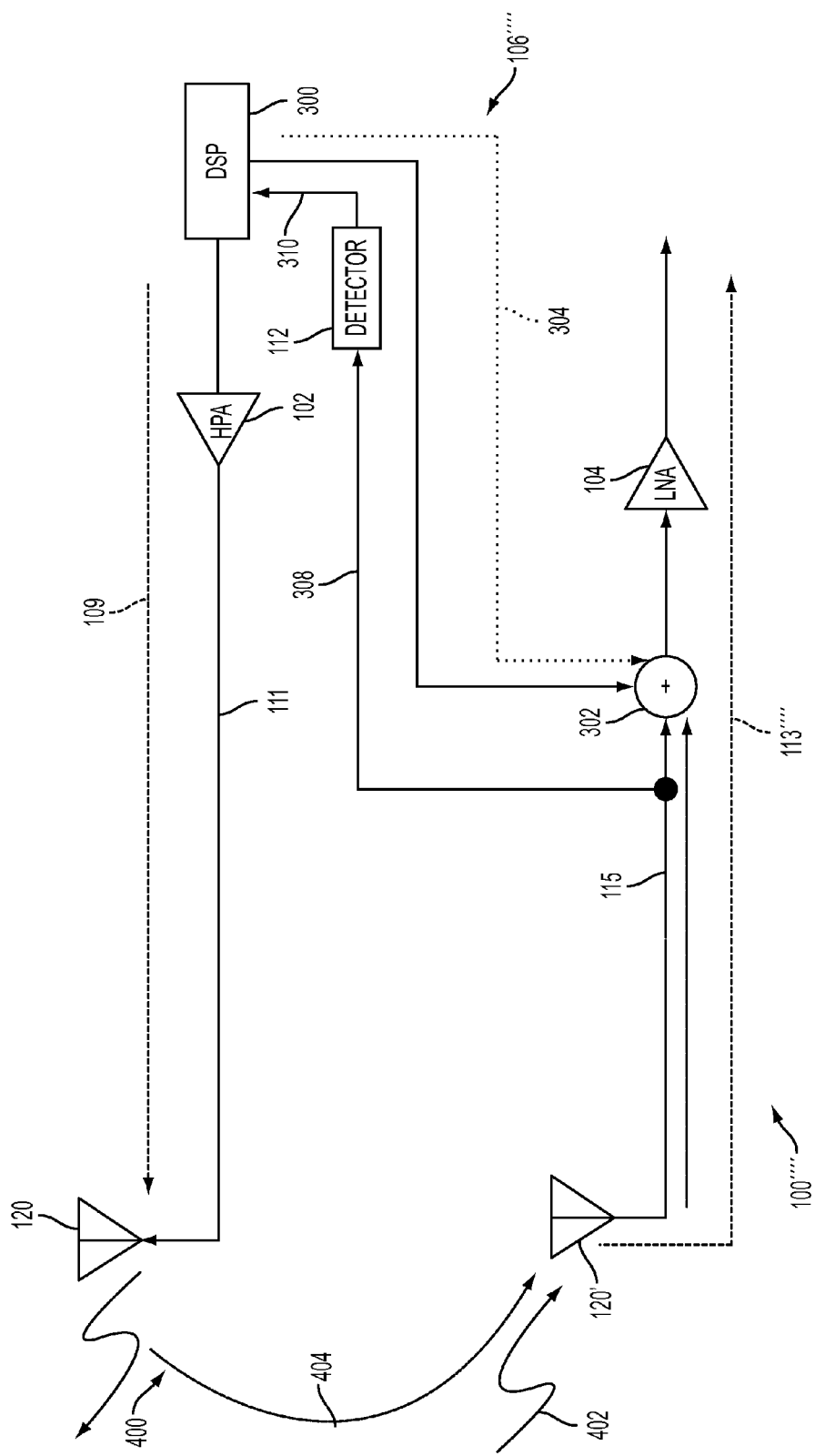
FIG. 8 is a schematic diagram illustrating a dual antenna feed-forward cancellation system in greater detail according to an exemplary embodiment.

Turning now to FIG. 8, a feed-forward cancellation system 100'''' including a dual-antenna system 400 according to an exemplary embodiment is illustrated in greater detail. The feed-forward cancellation system 100'''' includes a first antenna (i.e., a transmitting antenna) 120 connected to the transmitting line 111, a second antenna (i.e., a receiving antenna) 120' connected to the receiving line 115, and a cancellation unit 106. The cancellation unit 106'''' includes a DSP 300. The transmitting antenna 120 receives an original transmit signal 109 from a DSP 300 via the transmitting line 111. In response to the original signal 109, the transmitting antenna 120 communicates a response signal 402 to the receiving antenna 120' as understood by those ordinarily skilled in the art. However, a portion (i.e., an antenna leakage signal) 404 leaks between the transmitting antenna 120 and the receiving antenna 120'. In this regard, a signal leakage pathway exists between the transmitting antenna 120 and the receiving antenna 120'. The DSP 300 models the signal leakage pathway, and then utilizes the model to generate a cancellation signal 304 in order to cancel the saturation, e.g., the antenna leakage signal 404.

As described in detail above, the DSP 300 determines one or more types of saturation, such as the antenna leakage signal 404, which exists on the receiving line 115. Based on the antenna leakage signal 404, the DSP 300 generates a cancellation signal 304 that is added to the receiving line 115. The cancellation signal 304 has a phase that is shifted 180 degrees with respect to the antenna leakage signal 404. Accordingly, the cancellation signal 304 cancels the antenna leakage signal 404 such that the receiving element 104 receives the response signal 402 transmitted from the transmitting antenna without realizing one or more types of saturation.

Figure 9:
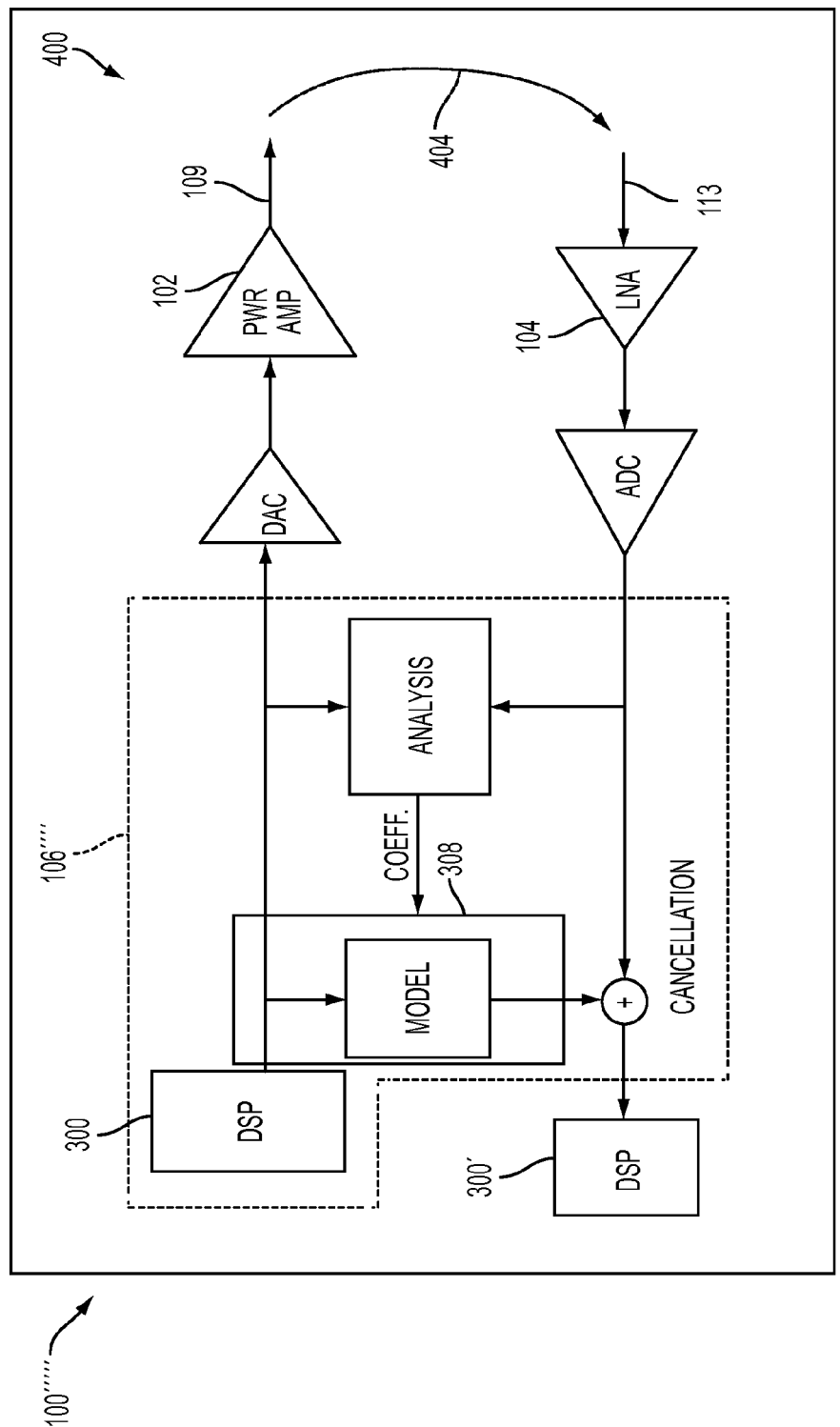
FIG. 9 is a schematic diagram illustrating a dual antenna feed-forward cancellation system according to another exemplary embodiment.

Referring to FIG. 9, a feed-forward cancellation system 100'''' including a dual-antenna system 400 is illustrated according to an exemplary embodiment. The feed-forward cancellation system 100'''' illustrated in FIG. 9 operates similarly to the feed-forward cancellation system 100'''' illustrated in FIG. 8 to perform cancellation of saturation from the received signal 113. The sample signal path 308 and the combiner 302, however, are located downstream from the receiving element 104, but upstream from a second DSP 300' that processes the received signal 113 on the receiving side.

Still referring to FIG. 9, the cancellation unit 106'''' compares the original transmitted signal 109 to the received signal 113 which includes the saturation, e.g., the leakage signal 404. Based on the comparison, the cancellation unit 106'''' determines the linear distortion that exists, and models the linear distortion according to a set of coefficients. In this regard, the cancellation unit 106'''' processes the coefficients using various data processing systems including, but not limited to, a Finite Impulse Response (FIR) filter system. A finite impulse response (FIR) filter (y) is modeled according to the following equation:

$$y(n) = \Sigma_{k=1}^{M} b_k x(n-k),$$

where 'b' represents the filter coefficients (weights), "k" represents the term being iterated, x represents the input signal, and n represents the filter order. The resulting output matches the leakage signal 404 adjusting for linear distortions, and provides accurate parameters for generating a cancellation signal. The linear distortions include, but are not limited to amplitude, time delay, frequency dependent attenuation and filter effects, and multipath effects.

The cancellation unit 106'''' further utilizes various algorithms including, but not limited to, a least mean squares (LMS) algorithm and a recursive least squares (RLS), each of which allows for an ability to ignore one or more signals that are uncorrelated to one or more types of saturation being analyzed e.g., the leakage signal 404. Accordingly, the cancellation unit 106'''' effectively removes saturation from the receiving signal 113 even in the presence of other external signals. By using an LMS algorithm, for example, a distortion of the leakage path is determined and a real time adaptive system is provided to synthesize a duplicate signal for cancellation of the leakage signal.

Figure 10:
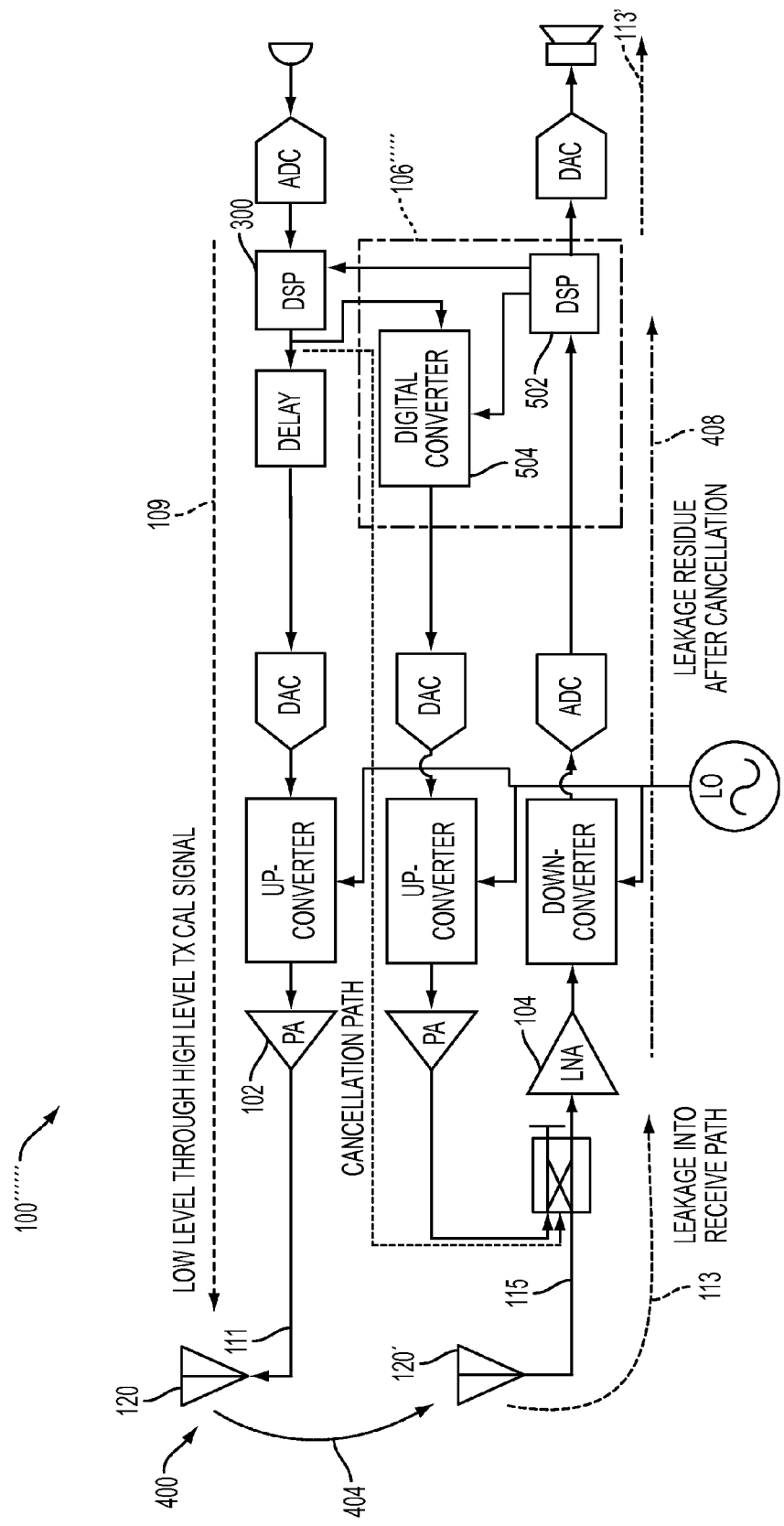
FIG. 10 is a schematic diagram illustrating a dual antenna feed-forward cancellation system according to yet another exemplary embodiment.

Referring now to FIG. 10, a feed-forward cancellation system 100'''''' including a dual-antenna feed-forward cancellation system 400 is illustrated according to an exemplary embodiment. The feed-forward cancellation system 100'''''' illustrated in FIG. 10 operates similarly to the feed-forward cancellation system 100'''' illustrated in FIG. 9 to cancel saturation from the received signal 113. The feed-forward cancellation system 100'''''' of FIG. 10, however, includes a cancellation unit 106'''''' configured as a leakage residue cancellation unit that cancels residual leakage 408 that exists following initial cancellation of the saturation from the received signal 113 traveling on the receiving line 115. One or more up/down converters are provided to respectively up-convert or down-convert the voltage of the system.

The leakage residue cancellation unit cancellation unit 106'''''' includes an electronic receiver digital signal processor (RDSP) 502 and an electronic filter cancelling unit 504 configured to generate a time delay when an RF signal is propagated along the delay line. The feed-forward cancellation system 100'''''' executes a dual-cancellation calibration process that performs a first operation that cancels the original saturation (i.e., the leakage signal 404 on the receiving line 115 and a second operation that cancels the residual leakage 408 which remains on the receiving line. Accordingly, a receiving signal 113' that excludes the residual leakage 408 is generated.

In regards to the first cancellation operation, a transmitter DSP (TDSP) 300 transmits a low-level calibration signal over the entire bandwidth of the transmitter antenna 120. The low-level calibration signal is, for example, a stepped swept sinusoid where transmission signals are a constant magnitude/phase. The phase ranges between 0 and 360 degrees. The RDSP 502 collects swept leakage data, and compares the received signal 113 to the transmitted signal 109. The swept leakage data may include, for example, two-dimensional (2D) array, magnitude and phase vs. frequency data. Based on the comparison, the RDSP 502 determines an impulse response of the system 100''''''. The impulse response is calculated according various algorithms including, for example, a Fourier transform algorithm as understood by those ordinarily skilled in the art.

The filter cancelling unit 504 includes a programmable filter system, such as a programmable FIR filter system for example. The RDSP 502 communicates with the filter cancelling unit 504, and programs the filter cancelling unit 504 according to an inverted impulse response. Accordingly, the filter cancelling unit 504 cancels the leakage 404 at the input of the receiving element 104. After cancelling the leakage 404 at the initial transmitting signal level, the TDSP 300 increases the transmitting signal level to a point where the leakage residue detected by the RDSP 502 exceeds a predetermined level and determines another impulse response at the increased transmitting signal level. According to at least one embodiment, the RDSP 502 stores filter coefficients in two-dimensional array of filter coefficients vs. RF level, and continuously repeats the process of determining the impulse response until a complete dynamic range of system power is characterized.

With respect to the second operation, any residual leakage 408 of the system 100'''''' is characterized and canceled. More specifically, the TDSP 300 determines the residual leakage 408 remaining after cancelling the original saturation (e.g., the original leakage signal 404) on the receiving line 115 for each of the RF levels and frequencies used to perform the calibration process described above. Thereafter, the RDSP 502 determines swept residual leakage data to determine a residual leakage signal 408. The swept residual leakage data includes, for example, two-dimensional (2D) array, magnitude and phase vs. frequency data. The RDSP 502 compares the residual leakage signal 408 to the original transmission signal 109 and determines an inverse Fourier transform to yield the impulse response corresponding to the system residue leakage 408.

The RDSP 502 then communicates with the filter cancelling unit 504, and programs the filter cancelling unit 504 according to an inverted impulse response of the system residue leakage 408. Accordingly, the residual leakage 408 is canceled from the RDSP 502 prior to any baseband signal processing/demodulation. In this regard, any baseband signal processing/demodulation components located downstream from the RDSP 502 receive the received signal 113', which excludes both the original saturation 404 (i.e., the original leakage signal 404) and the residual leakage 408.

Figure 11:
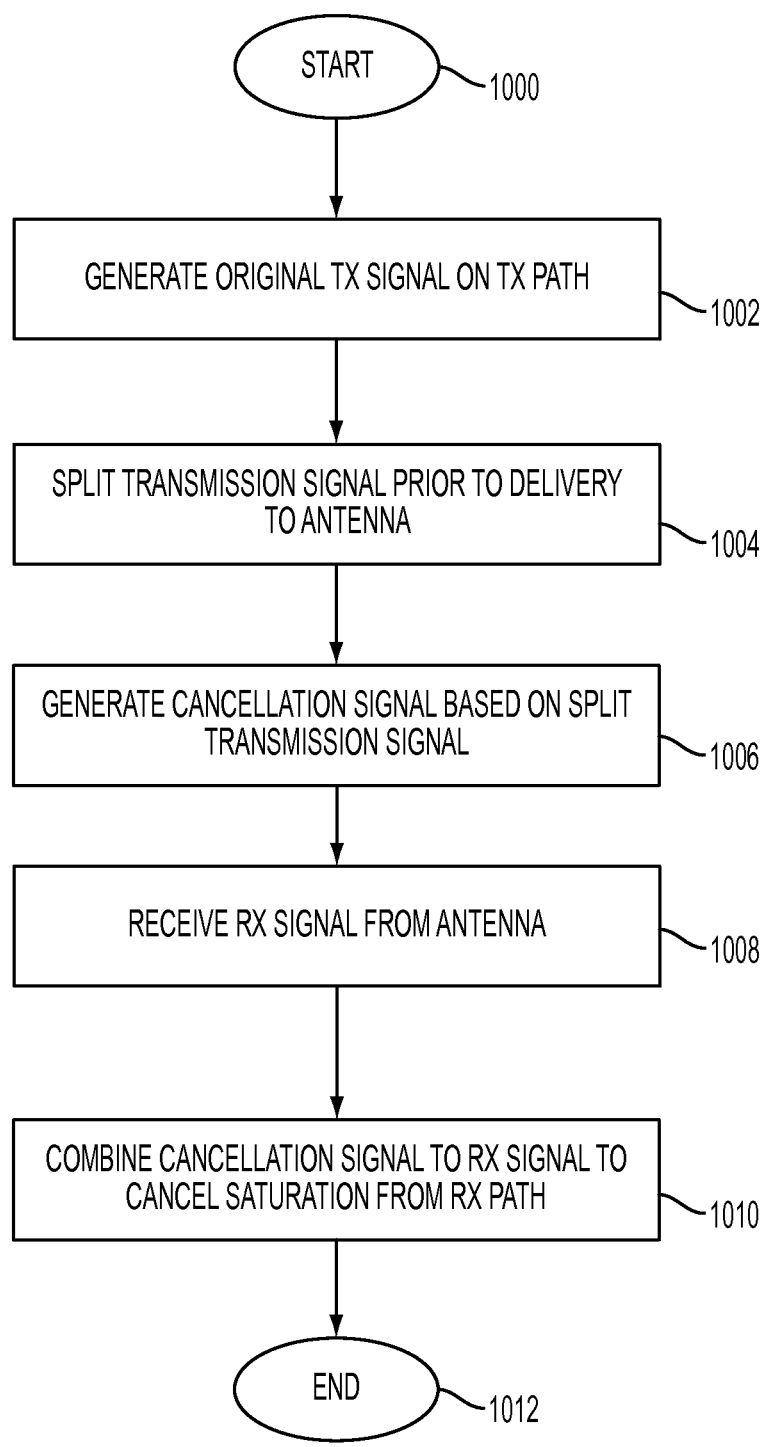
FIG. 11 is a flow diagram illustrating a method of eliminating saturation in a simultaneous transmitting and receiving system according to an exemplary embodiment.

Turning now to FIG. 11, a method for cancelling saturation from a received signal traveling on a receiving line of a simultaneous transmitting and receiving system is illustrated according to an exemplary embodiment. The method begins at operation 1000 and proceeds to operation 1002 to generate an original transmission (Tx) signal. The original Tx signal is delivered to a Tx path to be transmitted to an antenna. At operation 1004, the original Tx signal is split prior to being transmitted to the antenna. At operation 1006, a cancellation signal is generated based on the split transmission signal. According to at least one exemplary embodiment, the phase of split signal is shifted to generate the cancellation signal. At operation 1008, a received (Rx) signal generated by an antenna is received on a receiving line. The Rx signal is also coupled with one or more types of saturation existing on the receiving line. The saturation includes, but is not limited to, leakage signals, reflection signals, and interference signals. At operation 1010, the cancellation signal is combined with the Rx signal to cancel the saturation. Accordingly, an Rx signal excluding saturation is generated and the method ends at operation 1012.

Figure 12:
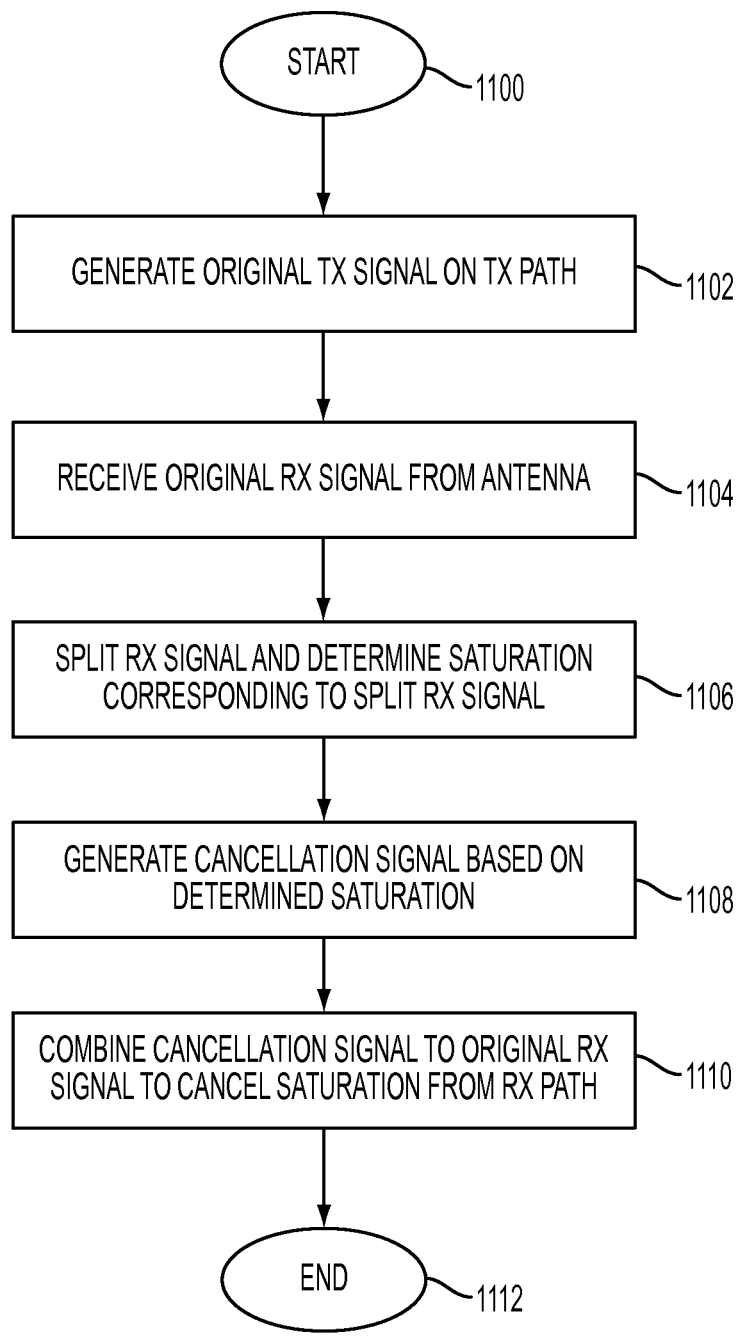
FIG. 12 is a flow diagram illustrating a method of eliminating saturation in a simultaneous transmitting and receiving system according to another exemplary embodiment.

Referring now to FIG. 12, a method for cancelling saturation from a received signal traveling on a receiving line of a simultaneous transmitting and receiving system is illustrated according to another exemplary embodiment. The method begins at operation 1100 and proceeds to operation 1102 to generate an original transmission (Tx) signal. The original Tx signal is delivered to a Tx path to be transmitted to an antenna. At operation 1104, a received (Rx) signal generated by an antenna is received on a receiving line. The Rx signal is coupled with one or more types of saturation existing on the receiving line. At operation 1106, the original Rx signal is split and the type of saturation (i.e., leakage signals, reflection signals, and interference signals) included with the original Rx signal is determined. At operation, 1108, a cancellation signal is generated based on the determined saturation. According to at least one exemplary embodiment, the phase of the cancellation signal is shifted 180 degrees with respect to the determined saturation. At operation 110, the cancellation signal is combined with the original Rx signal and the method ends at operation 1112. Accordingly, an Rx signal excluding the determined saturation is generated.

Figure 13:
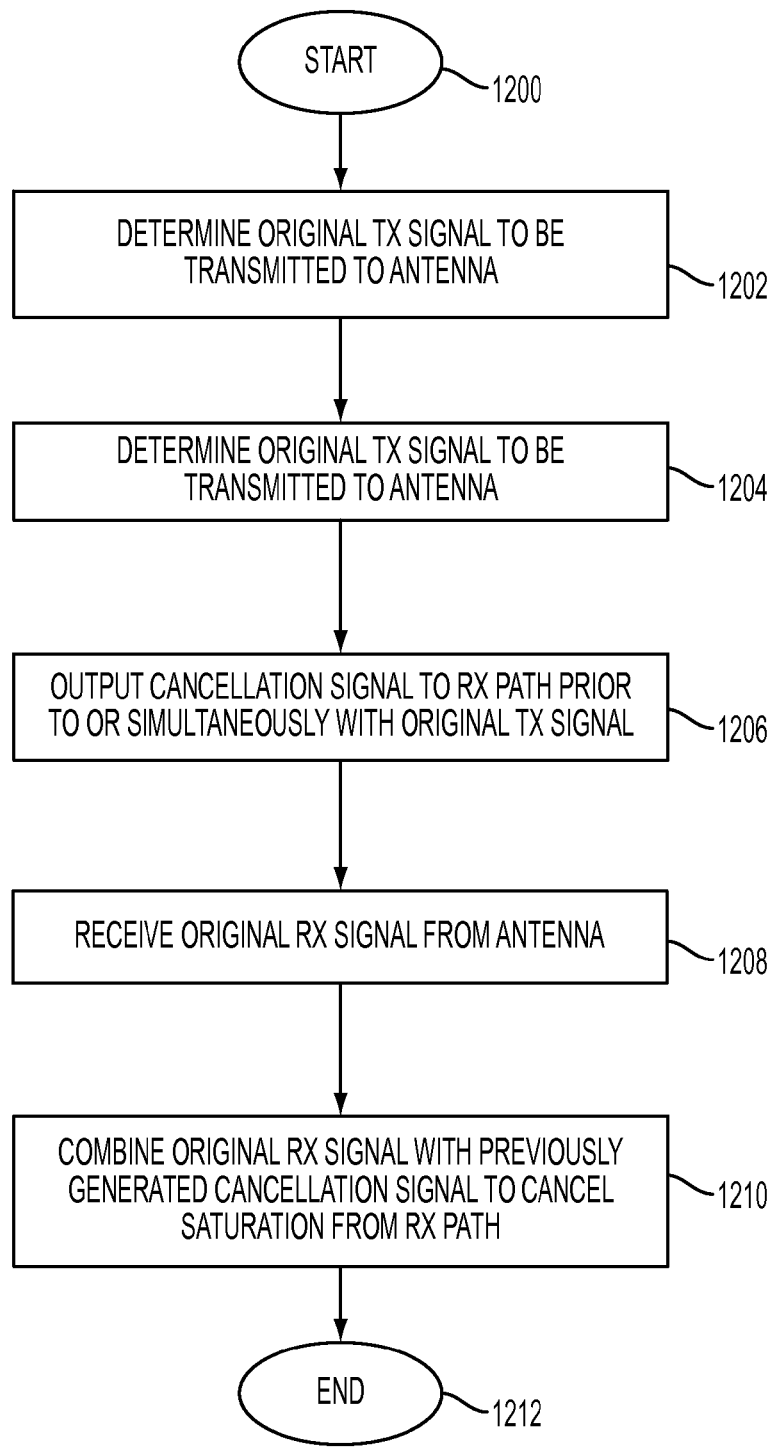
FIG. 13 is a flow diagram illustrating a method of eliminating saturation in a simultaneous transmitting and receiving system according to yet another exemplary embodiment.

Turning to FIG. 13, another method for cancelling saturation from a received signal traveling on a receiving line of a simultaneous transmitting and receiving system is illustrated according to an exemplary embodiment. The operation begins at operation 1200, and at operation 1202 an original Tx signal to be transmitted to an antenna is determined. Based on the desired original Tx signal, a cancellation signal is determined at operation 1204. At operation 1206, the original Tx signal and the cancellation signal are simultaneously generated. Accordingly, the original Tx signal is delivered to a Tx path before being transmitted to an antenna and the cancellation signal is delivered to an Rx path before receiving an Rx signal from an antenna. According to at least one exemplary embodiment, the phase of the cancellation signal is shifted based on the original Tx signal and/or a model of a signal leakage pathway. At operation 1208, an original Rx signal is received from an antenna and delivered to the Rx path. At operation 1210, the original Rx signal is combined with the previously generated cancellation signal delivered to the Rx path and the method ends at operation 1212. Accordingly, any saturation coupled to the Rx signal is immediately canceled.

As can be appreciated according to the various exemplary embodiments described in detail above, an original transmission signal is sampled to cancel one or more types of saturation that leak onto the receive line and couple to the original received signal in RF applications. By cancelling the saturation based on the sampling of the transmission signal, a more precise received signal is provided.

Theoretical Passive Reflection Mitigator

The cancellation network for a single frequency channel and a single reflection has been modeled using Agilent Advanced Design System (ADS). In this model a blade antenna may be included to provide a load, and the circuit is swept over 300 kHz to 2 GHz. The blade antenna may operate over frequency range of approximately 100 to approximately 500 MHz, for example, but has the potential of being used upwards of 1000 MHz or higher. It is appreciated that depending on the frequency of the transmitted signal, some will be radiated and some will reflect back. The reflections may be analyzed in the time domain. At 830 MHz, the antenna may be fairly well matched with a return loss of −20 dB, while at 1000 MHz, the return loss is only −6 dB.

A "Reflect" network may be inserted into the feedforward path that cancels the reflections. The forward transfer magnitude characteristic of the reflect network made equal to the magnitude of the measured antenna reflections plus additional frequency dependent losses in the network. The forward transfer phased characteristic of the reflect network made equal to the phase of the S11 of the blade antenna. Signals through this network will have the same (ideal) frequency complex response compared to the signal that bounces back off of the input port of the antenna.

The cancellation at the receiver amplifier can utilize for example a low-noise amplifier (LNA). In this case, because the reflection mitigation network is ideally derived from the non-varying input impedance of the load, the cancellation is ideal. The signal reflected back without the cancellation through an ideal circulator is shown in blue. It can be seen that this signal is at best just better than 20 dB below the transmitted signal, but is mostly near 10 dB below and tracks the return loss characteristic of the blade antenna discussed above. However, with the reflection mitigation network in place, the cancellation drops to −100 dB, the isolation specified for the ideal circulator in the model.

A passive reflection mitigating network may be provided with the group delay of the antenna reflections. The group delay is well behaved for portions of the frequency band, especially higher than 1 GHz. However, below 1 GHz, the group delay, which is the derivative of the phase of the response versus frequency, may be irregular. For portions of the frequency band where the group delay is very well behaved, the reflections can be mitigated with a feed forward architecture that only has a time delay, plus appropriate attenuation control. Having a line stretcher with an appropriate attenuation can cancel the reflection. However, for cancellations over a wider frequency band or for other antenna elements that are not well-behaved over the entire frequency band, a passive reflection mitigator network may be included in the feed forward path.

In another embodiment, the reflection mitigation network can be designed to compensate for reflections from the antenna at a single frequency point. It can be seen that the cancellation achieves the isolation of the ideal circulator, −100 dB, at one frequency only. If the network is detuned by adjusting the time delay in the cancellation path, it can be seen that the bandwidth of the cancellation increases, however, the level of cancellation degrades. This optimization could be a worthwhile tradeoff for certain applications. In addition, cancellation at a single frequency point with the time delay detuned results in a broadening of the cancellation bandwidth, but decreases the cancellation.

Passive Reflection Mitigation Network Implementation

The passive reflection mitigation network can be added to a feed forward architecture to increase the bandwidth of the cancellation. An area of concern, however, is the synthesis for this network.

The forward transfer characteristic of the network itself needs to have a response that matches the input reflection characteristic (e.g. impedance) of the antenna or the device that is being mitigated. By creating a network whose transmission characteristics match the antenna reflection characteristics, the signal passed through the feed forward path can be identical to the reflected signal. Mathematically, this network is easy to implement. However, it is more of a challenge to actually synthesize these complicated networks with real components. Vector fitting and other curve fitting techniques, which can be performed with Matlab, can derive a transfer function that matches the network performance. These transfer functions can be quite complex and hence difficult to implements. For example a transfer function that matches the blade antenna return loss used in the examples above has 31 poles, which is a challenge to implement.

Once the network has been determined, techniques such as Brune's synthesis can be utilized to realize a resistor-inductor-capacitor (RLC) network that has the response. The order of the network needs to be adjusted to trade off the level of cancellation that is achievable with the difficulty of implementing the network. As we will address in a later section, being able to do this within the lattice spacing for an array provides an even greater level of complexity.

To implement a network, a symmetric one port can be decomposed into a combination of two one-ports. The one-ports' behavior can then be approximated by a rational function via Vector Fitting as described here. According to an embodiment, a method provides a feature that allows for decomposing symmetric two-port networks into a network of one-ports. The fitting of a positive real function to one-ports may be represented by the following equation:

$$Z = \frac{a_n s^n + \ldots a_1 s + a_0}{b_n s^n + \ldots b_1 s + b_0}$$

The rational function can then be used to synthesize a network using Brune's synthesis. A two-port network can be obtained by combining the synthesized one port networks.

Other implementation techniques include tunable filter approaches. These would add the capability to adjust the response of the circuit on-board or even in-flight as a BIT mode. For small signals utilizing these techniques, active filter implementations can be considered. The fitting algorithms can output poles and residues which can then be converted into Laplace Transfer function numerators and denominators which can then be used to create a Verilog-A file for implementation into an active filter. Having an active filter implementation would also enable another architecture approach that could eliminate the need for bulky channelizing filters.

The reflection mitigation network can be tunable such that it can be adjusted based on the frequency of the input signal. In much the same way that the mission computer and exciter in a radar system tells the beam steering controller what frequency it will be operating at to properly adjust phase shifters and calibration coefficients in the T/R module, the reflection network controller can adjust the network to match the antenna input impedance for the frequency of operation. In addition, having a tunable reflection mitigation network could be used to tune out variations in the input impedance of a radiating element in an array over its scan volume. Mutual coupling in the array can vary the input impedance of the element by a significant amount. A commonly used approach for understanding this variation is to use the cosine of the steer angle to determine the real part of the input impedance. For example, an array steered to 60 degrees would exhibit a 50% change in input impedance. This could be a mismatch as much as 60% of the power reflecting back from an otherwise matched radiator. A more rigorous measurement of this impedance change is also possible with phenoms or mutual coupling arrays that can be measured in an anechoic chamber.

Calibration

To successfully implement this type of architecture, the tunable cancellation element needs to be adjustable and calibrated. The tunable cancellation element may comprise of, for example, tunable delay lines, tunable attenuators, and passive reflection mitigation networks. The system may adjust the variable attenuators in each of the channels and adjust the delay lines to match the installation. Having control of these elements will mitigate manufacturing and assembly tolerances. In an outdoor or anechoic environment where reflections can be minimized, the system can be tuned to minimize reflections at the receiver. A signal in the band of interest can be injected into the system and the attenuator and the delay line can be swept to find the minimal return to the receiver. In at least one embodiment there may be a controller similar to a beam steering computer that will be used to control the circuit and to store the values.

In operation, the network will effectively be passive not requiring any adjustment from changes in the input signal. This, however, makes an assumption that the reflections from the antenna and leakage through the circulator are neither power dependent nor time variant. As mentioned previously, the radar could run BIT mode that calibrates the antenna by sampling reflections where it knows none should be and adjusting the reflection network accordingly. Furthermore, the control circuitry could include various calibration constants for drive levels into the antenna system. In the antenna system, the drive levels could affect the level of compression and the harmonics that are present. Varying the drive level would change the level of these harmonics, potentially affecting the signals that reflect back to the receiver. The calibration algorithm may characterize the reflections at various drive levels to determine how much optimization is necessary. If it is determined that calibration adjustments are necessary for various drive levels, the system needs to have the protocols in place for the exciter to notify the cancellation controller of the level. Also, the controller needs to have enough memory to store these additional parametric constants.

If the architecture that utilizes a tunable reflection mitigation network is chosen, the controller may adjust this network, as well. This network can also be calibrated in a non-reflecting environment, and may include digital signal processing techniques to determine the response. A starting point for the network would need to be known either through simulation or through measurement of passive phenoms. Once a starting point is known and in place, the network can be adjusted in-situ to optimize the performance. This is a similar technique as tuning matching networks in a circuit. This could add a significant amount of time and accuracy requirements to the calibration process. However, it may include implementation in an array environment.

The addition of the time domain realization of the reflection mitigation network broadens the bandwidth that is applicable for such a circuit. However, it is estimated that this technique could yield 40 dB or more of isolation over 100 seconds (s) of MHz of bandwidth. It is assumed that a feed forward approach without the reflection mitigation network could achieve 20 dB of isolation over 10 s of MHz of bandwidth.

The type of cancellation and improvement in isolation described in detail above may be applicable to various applications including, but not limited to, radar, communications, electronic warfare, electronic protection and multifunction RF systems. For RF systems to operate while simultaneously transmitting and receiving, the overall isolation between the channels would need to approach or exceed 100 dB. Sufficient isolation at the RF front end may be provided to prevent saturation of the entire RF front end through analog to digital converter (ADC) stages. Accordingly, digital techniques may be applied linearly to the self-interference signal residue. Therefore, this channelized cancellation technique would may be combined with other approaches.

Having the ability to simultaneously transmit and receive as enabled by these technology improvements may also increase the effectiveness of federated systems and may save on size, weight, and power (SWAP) and cost. Regarding naval systems, for example, there exists a potential to combine apertures enabling additional systems on the ship or the increase the aperture size of the existing systems, increasing their radiated power. For airborne radar, systems, for example, the entire timeline may be utilized instead of time duplexing. In addition, electronic protection may be provided or existing capability may be enhanced significantly. Regarding communications systems, for example, more robust communication channels may be provided.

Array Concepts

Preset teachings of the disclosure may be applied to arrays. For example, it can be appreciated that the cancellation network can be applied to a subarray or at the element level. These system level trades will need to be made to determine the SWAP available for the additional cancellation components. The next section will address implementation. The concept may also be applied at lower frequencies, such as S-Band, where the half-wavelength spacing is roomier, instead of at X or Ku. The feed-forward components may also be optimized to handle several reflections simultaneously. In addition, the reflection mitigation network may be an adaptive network that adapts dynamically to varying scan angles.

The concept may also be implemented into an active array lattice spacing. At least one embodiment may include a feed forward approach without a reflection mitigation network. For certain applications and bandwidth, a passive reflection mitigation network may not be necessary to achieve the desired level of isolation. For example, a return loss, magnitude and phase resulting from a waveguide test is illustrated. The relatively well-behaved phase of the reflected signal can be mitigated to a certain extent with a delayed copy of the signal only. In addition, the amplitude of the signal needs to be matched to the reflected signal. This feed forward approach can be implemented with a line stretcher and an amplifier.

According to an embodiment the group delay for the antenna element can be implemented with and without delay compensation. It is appreciated that any "discontinuity" that may be interpreted from the graph is an artifact of the measurement equipment hardware, and is not an effect of the canceller. The phase response of the reflection can also be realized. This feed forward signal, which receives a 90 degree shift as it is coupled from the transmit amplifier through a hybrid and then another 90 degree shift as it couples back to the receive path, properly adjusted for amplitude and delayed in time to coincide with the reflected signal from the antenna is cancelled before the receiver. An effect can be realized where the signal strength versus frequency for a signal reflected back from the antenna at the top portion of the diagram. The bottom signal illustrates the reflected signal combined with the feed forward signal. The compensation is applied in 20 MHz pieces. The signal in red is a combination of these 20 MHz pieces over the full operation band of the element. A 15-20 dB improvement can be seen over any instantaneous 20 MHz bandwidth.

The corresponding structures, materials, acts, and equivalents of all means or step plus function elements in the claims below are intended to include any structure, material, or act for performing the function in combination with other claimed elements as specifically claimed. The description of the various exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiments were chosen to enable others of ordinary skill in the art to understand the invention for various embodiments with various modifications as are suited to the particular use contemplated.

While various exemplary embodiments have been described, it will be understood that those skilled in the art, both now and in the future, may make various modifications to the exemplary embodiments that fall within the scope of the claims which follow. These claims should be construed to maintain the proper protection for the invention first described.

What is claimed is:

1. A wideband radio frequency (RF) interference cancellation system, comprising:

an electronic channel canceller configured to split an electronic reference signal output from an electronic transmitting element into a plurality of band signals;

an electronic receiving element configured to receive the electronic reference signal;

a low pass filter, a mid pass filter, and a high pass filter each in electrical communication with the channel canceller, the at least one electronic band pass filter configured to receive a respective band signal delivered to a respective channel; and at least one electronic tunable cancellation element in electrical communication with a respective band pass filter, the at least one tunable cancellation element configured to tune the respective channel such that reflections are canceled before being input to receiving element, wherein the at least one electronic tunable cancellation element includes a first electronic tunable cancellation element interposed between the low pass filter, a second electronic tunable cancellation element interposed between the mid pass filter, and a third electronic tunable cancellation element interposed between the high pass filter.

2. The wideband RF interference cancellation system of claim 1, wherein the first, second, and third tunable cancellation elements each have a different frequency response setting with respect to one another.

3. The wideband RF interference cancellation system of claim 2, further comprising:
an electronic signal detector having an input interposed between a transmission path and the receiving element, the signal detector configured to determine at least one signal characteristic of a transmission signal traveling on the transmission line; and
an electronic canceller microcontroller in electrical communication with the signal detector and configured to control at least one of the first, second, and third electronic tunable cancellation elements to actively tune a respective channel based on the at least one signal characteristic of the transmission signal.

4. The wideband RF interference cancellation system of claim 3, wherein the at least one characteristic of the transmission signal is determined before delivering the transmission signal to the receiving element.

5. The wideband RF interference cancellation system of claim 4, wherein the at least one characteristic of the transmission signal includes at least one of a reflection of the transmission signal, leakage of the transmission signal, a voltage level of the transmission signal, and a frequency of the transmission signal.

6. The wideband RF interference cancellation system of claim 5, wherein a portion of transmission signal is diverted to the first, second, and third electronic tunable cancellation elements to determine the at least one signal characteristic.

7. The wideband RF interference cancellation system of claim 6, wherein at least one of the first, second and third tunable cancellation elements sample the portion of the transmission signal and outputs a sampled cancellation signal to a receiving line connected to an input of the receiving element.

8. The wideband RF interference cancellation system of claim 7, wherein the sampled cancellation signal cancels leakage existing on the receiving line.

9. A method of actively cancelling interference from a wideband radio frequency system, the method comprising:
generating a transmission signal to be delivered to a receiving element;
splitting the transmission signal into a plurality of band signals;
receiving at least one band signal delivered to a respective channel using a low pass filter to receive respective low pass band signal, a mid pass filter to receive a respective mid pass band signal, and a high pass filter to receive a respective a high pass band signal;
sampling a portion of the transmission signal using first, second, and third tunable cancellation elements connected to outputs of the low pass, mid pass, and high pass filters, respectively; and
tuning the respective channel such that reflections are canceled before being input to the receiving element.

10. The method of claim 9, wherein the first, second, and third tunable cancellation elements each have a different frequency response setting with respect to one another.

11. The method of claim 10, further comprising:
determining at least one signal characteristic of a transmission signal traveling on the transmission line; and
controlling at least one of the first, second, and third electronic tunable cancellation elements to actively tune a respective channel based on the at least one signal characteristic of the transmission signal.

12. The method of claim 11, further comprising determining the at least one characteristic of the transmission signal before delivering the transmission signal to the receiving element.

13. The method of claim 12, wherein the at least one characteristic of the transmission signal includes at least one of a reflection of the transmission signal, leakage of the transmission signal, a voltage level of the transmission signal, and a frequency of the transmission signal.

14. The method of claim 13, further comprising diverting the portion of transmission signal to the first, second, and third electronic tunable cancellation elements to determine the at least one signal characteristic.

15. The method of claim 14, further comprising sampling the portion of the transmission signal using at least one of the first, second and third tunable cancellation elements and outputting a sampled cancellation signal to a receiving line connected to an input of the receiving element.

16. The method of claim 15, further comprising cancelling leakage on the receiving line using the sampled cancellation signal.

* * * * *